United States Patent [19]

Doyle et al.

[11] 4,418,383
[45] Nov. 29, 1983

[54] DATA FLOW COMPONENT FOR PROCESSOR AND MICROPROCESSOR SYSTEMS

[75] Inventors: Donald E. Doyle, Delray Beach; George A. Hellwarth, Deerfield Beach; Jack L. Quanstrom, Boca Raton, all of Fla.

[73] Assignee: International Business Machines Corporation, Armonk, N.Y.

[21] Appl. No.: 164,738

[22] Filed: Jun. 30, 1980

[51] Int. Cl.³ ............................ G06F 1/00; G06F 3/00
[52] U.S. Cl. .................................................. 364/200
[58] Field of Search ... 364/200 MS File, 900 MS File, 364/712

[56] References Cited

U.S. PATENT DOCUMENTS

| | | | |
|---|---|---|---|
| 3,462,742 | 12/1966 | Miller et al. | 364/200 |
| 3,579,201 | 9/1969 | Langley | 364/200 |
| 3,798,606 | 3/1974 | Henle et al. | 364/200 |
| 3,987,291 | 10/1976 | Gooding et al. | 364/200 |
| 3,988,717 | 10/1976 | Kisylia | 364/200 |
| 4,079,451 | 3/1978 | Woods et al. | 364/200 |
| 4,093,993 | 6/1978 | Sato | 364/900 |
| 4,161,784 | 7/1979 | Cushing et al. | 364/200 X |
| 4,206,503 | 6/1980 | Woods et al. | 364/200 |
| 4,210,960 | 7/1980 | Borgerson et al. | 364/200 |
| 4,224,676 | 9/1980 | Appelt | 364/900 X |

OTHER PUBLICATIONS

Adams, W. T. et al., "How Bit-Slice Families Compare", Electronics Magazine, Aug. 3, 1978, p. 91.
Nemec, Dr. J. et al., "A Primer on Bit-Slice Processors", Electronic Design, No. 3, Feb. 1, 1977, pp. 52-60.
Clymer, J., "Use 4-Bit Slices", Electronics Design, No. 10, May 10, 1977, pp. 62-71.
"Special Monograph: Bit-Sliced Microprocessor Architecture", in Computer (Mag)., Jun. 1978, by N. A. Alexandridis, pp. 56-80.
Monolithic Memories, Inc. Catalog, Aug. 1974; "4-Bit Expandable Bipolar Microcontroller", pp. 1-19.
Electronics (Mag)., Aug. 2, 1979, "ECL Accelerates to New System Speeds with High-Density Byte-Slice Parts", by P. Cho; pp. 120-125, AM2900 Family Data Book by Advanced Micro Devices, pp. 2-2 to 2-9.

*Primary Examiner*—Mark E. Nusbaum
*Assistant Examiner*—William G. Niessen
*Attorney, Agent, or Firm*—D. Kendall Cooper; William N. Hogg; J. Jancin, Jr.

[57] ABSTRACT

A Large Scale Integration (LSI) data flow component is described for use as a building block, the component being capable of use singly or in combination to provide data flow paths and functions of different data widths for a processor or microprocessor. A component with an eight-bit data flow is described as a "byte slice", wherein individual byte control is provided within a multiple-byte configuration so that single data flow components within the group can operate independently of other components under control of external logic. Components may operate on a stand-alone, a multiple-byte, or nonactive-byte basis. A control scheme permits functions of one component to be influenced by actions or logic of another component to permit efficient implementation of arithmetic algorithms.

2 Claims, 4 Drawing Figures

DATA FLOW

STAND-ALONE
CONFIGURATION

MULTIPLE DFC
CONFIGURATION

MULTIPLE DFC
CONTROL DIAGRAM

DATA FLOW COMPONENT FOR PROCESSOR AND MICROPROCESSOR SYSTEMS

BACKGROUND OF THE INVENTION

The invention relates to a data flow component and to its utilization in processor and microprocessor systems, the component serving as a basic building block in a Large Scale Integration (LSI) environment.

Present state of the art systems may utilize general purpose chips that can be used for more than one computer function. For example, an Arithmetic Logic Unit (ALU) function and a control unit function are examples of computer functions that may be implemented by the identical general purpose chip. As chip circuit densities increase, more circuits and hence more functions may be provided on each chip. More functions are achieved merely by generating the various masks used in processing the chip, and additional materials, per se, are ordinarily not needed. A practical constraint is the number of terminals that can be physically placed on a chip. A compromise, therefore, results between available input/output control terminals, the complexity of the function and the number of terminals required to support a given level of complexity.

A similar problem was faced earlier in the integrated circuit art and resulted in a circuit packaging approach for Central Processing Unit (CPU) functions referred to in the art as "bit slicing". The concept of "bit slicing" involves employing a number of identical chips, each of which can typically perform ALU functions on two multiple-bit inputs, the chips operating in parallel to handle operands of, for example, 16 bits. Each of these chips include "mode control terminals" which function to establish and control the assignment of each chip to a preselected slice of the multi-slice word or words being processed.

Many of the second level components employed to implement the ALU function on a bit-slice basis, such as registers and multiplexers, are also employed in the implementation of functions other than ALU functions that are necessary to CPU operations. Thus, additional CPU functions which are separate and distinct from the ALU functions and related control lines may be added to a chip that has been designed to implement an ALU function on a bit-slice basis for assigning the individual chips to preassigned bit positions of a multi-bit ALU function or to non-ALU functions. An example of such a non-ALU function is the control, i.e., addressing of a microcode memory.

The data flow component described herein concentrates only on the data flow portion of a computer system. It may, therefore, be more sophisticated or optimally tailored to that particular application.

SUMMARY OF THE INVENTION

The data flow component of the present invention provides slice-function control inputs that selectively condition a chip to function according to its position in the data flow as (1) least significant byte, (2) most significant byte, (3) intermediate byte, or (4) independently of signals applied to other bytes. In addition, however, a non-active byte mode with carry bypass logic is provided that permits any slice or combination of slices to be selectively disabled under program control so that remaining active slices can work together as a single data flow unit regardless of physical position. The preferred embodiment described herein utilizes an 8-bit configuration referred to as a "byte-slice" but other basic component sizes can be utilized instead of the "byte-size". Thus, it is entirely feasible to make use of a "nibble", i.e., 4 bits, two bytes, i.e., 16 bits, or other desired bit-size configuration.

Provision is made for the connection of two or more chips to handle operands exceeding the data flow width of a single chip; in other words, combining of slices to form wider data paths, and provision of interconnections to handle carries between chips.

Another characteristic of the present data flow component is the logical control of carry signal paths within each slice to permit single slices to operate in standalone mode or arbitrary combinations of slices to operate on selected data paths without obstruction or interference by inactive slices (nonactive bytes) located in the carry signal paths between active slices.

An efficient interslice control scheme is provided by encoded interslice control lines that permit the functions of one slice to be influenced by the actions or logic of another slice, for implementation of very efficient algorithms, such as conversions to absolute value and the modified Booth algorithm that are described in detail below.

Other features of interest in the present arrangement are:

(1) Specifies parallel bit input terminals;
(2) Provides multiplexing for selectively outputting data from functional units (ALU or shifter) or registers;
(3) Provides gating of the contents of at least two registers to the arithmetic unit; and
(4) Provides single bit and double bit shifting as data is transferred between registers or between the arithmetic unit and the registers.

For a better understanding of the present invention, together with other and further advantages and features thereof, reference is made to the description taken in connection with the accompanying drawings, the scope of the invention being pointed out in the appended claims.

Figure 1:
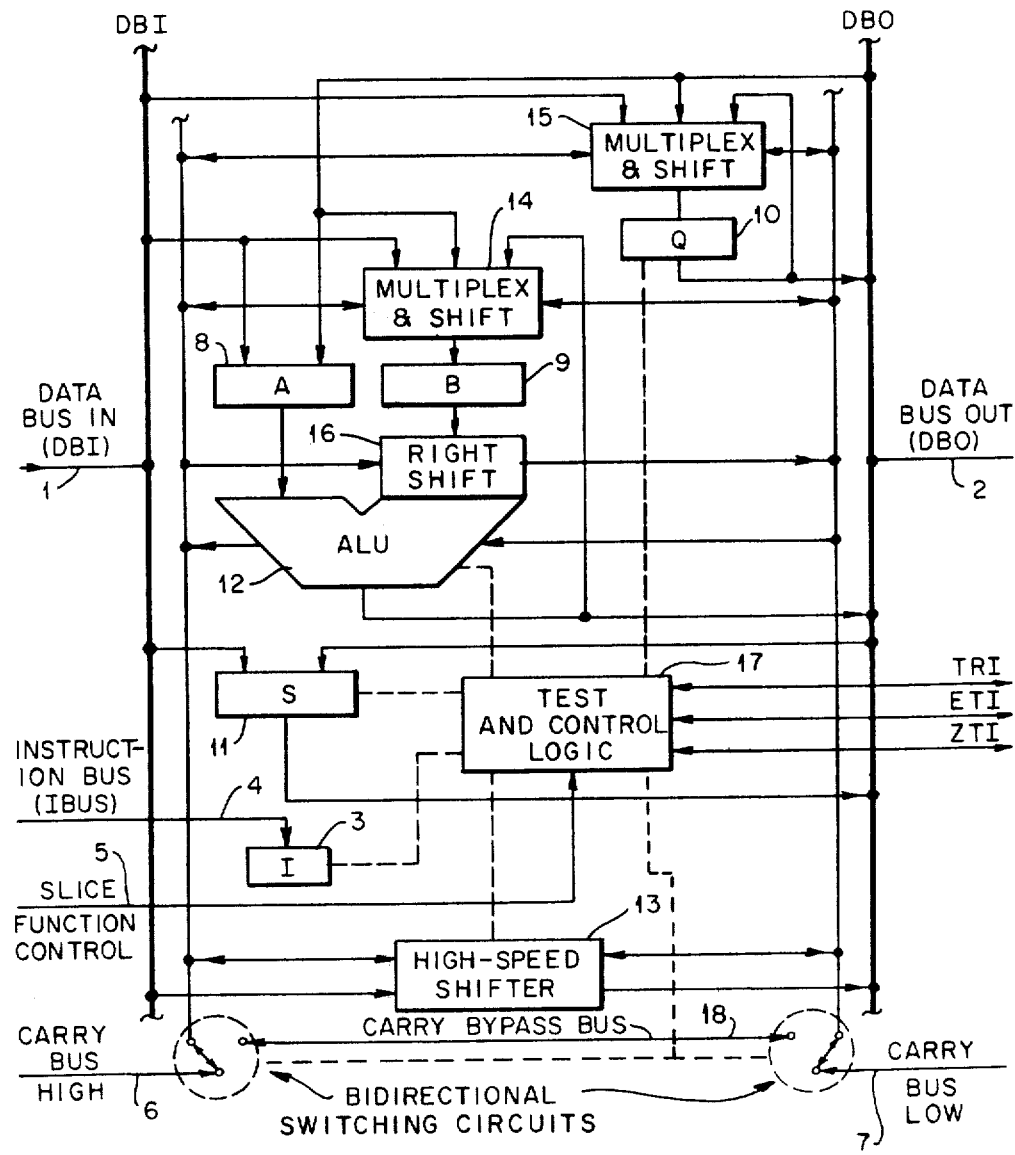
FIG. 1 is a data flow diagram of the data flow component, the dotted lines being major control line paths.

DETAILED DESCRIPTION OF BYTE-SLICE DATA FLOW COMPONENT AND ITS USE IN VARIOUS SYSTEMS

The high function data flow component of the present invention is designed for use as a large scale integration (LSI) building block in processor and microprocessor systems. It is characterized by (1) byte-slice structure, (2) slice function control, (3) carry signal control for selective slice operations, and (4) an interslice control scheme. LSI technology allows fewer parts, with different part numbers, to be manufactured and carried in stock with resultant economic benefits. However, two criteria limit the reduction of part numbers, i.e., the upper limit of logic complexity permitted by current LSI technology, such as number of gates per chip, and the reduction in flexibility or performance that may result from increasing functional complexity.

These limitations are eliminated by a building block design of a single part number, high function data flow component that can be used singly or in a combination of identical part number components to provide data flow paths and functions of different data widths to meet the needs of a large variety of different LSI processor or microprocessor applications with a wide range of system complexity. Components similar to this have been marketed as "bit-slice" microprocessor architectures. Heretofore the structures of these components have been limited to slice widths of two and four bits with relatively simple functional characteristics. The present design differs in its solutions of the specific problems by incorporating a high functional capability and a high degree of application flexibility in an 8 bit "byte-slice" that can be used not only to provide data flow functions for a microprocessor or a simple controller, but it can also serve as an efficient data flow component in the structure of sophisticated large scale processor units with data widths up to and possibly exceeding 64 bits. The design also differs significantly from previous art in its capability of individual byte control within a multiple-byte configuration, so that single slices or any selected group of slices can operate independently of other slices under the control of external logic.

The "byte-slice" data flow component features: (1) dependence of required functional characteristics on slice position, i.e., the behavior of the slice logic depends on whether it is in the most significant, least significant or an intermediate position, or is being used as a standalone slice; (2) efficient mechanism for handling arithmetic and shift carries between slices, permitting noncontiguous slices to be linked as easily as contiguous slices, without special external switching circuits, such that slices can be selectively inactivated under external control to alter the effective data path in such a way as to include any desired combination of slices in the effective data path; and (3) efficient interslice communications such as required when the action of a given slice depends on conditions originating in another slice.

FIG. 1 is a data flow diagram of the data flow component, with the dotted lines being major control line paths. It includes the following elements:

Data Bus In 1 (DBI), 8 bits wide
Data Bus Out 2 (DBO), 8 bits wide
Instruction I register 3
Instruction bus (I Bus) 4, 10 bits
Slice Functon Control 5 (encoded control lines that determine status of a slice: Active, Nonactive, etc.)
Bidirectional carry bus 6, high end, 8 bits
Bidirectional carry bus 7, low end, 8 bits
Operand registers A and B designated 8 and 9, 8 bits each
Q register 10, 8 bits (Operand B extension for multiplying, divide and extended shift instructions)
Status (S) register 11, 8 bits
Arithmetic Logic Unit (ALU) 12 with B-operand preshifter
High speed shifter 13 (8-bit combinatorial barrel shifter with associated registers and control logic, the barrel shifter through selective gating providing a single or multiple shift capability in a single timing interval. A high-speed shifter that is suitable for this function is described in the article entitled "High-Speed Combinatorial Logic Bit Shifter" by K. L. Doty and J. L. Quanstrom and appeared in the IBM Technical Disclosure Bulletin in February 1976 at Pages 2753-2754.)
Test and control logic 17 (acts on instructions, provides control and test signals pertaining to the data flow component)
Carry bypass bus 18. (Provides path for carries between external adjacent slices when represented slice is in nonactive byte mode)

These elements and the operations they perform are presented as being representative of a "byte-slice" configuration for a data flow component in accordance with the present invention.

The functions provided by the data flow component are the following:
All basic ALU functions (OR, AND, XOR, addition, subtraction, etc.)
Divide step (Each instruction cycle executes one step of a nonrestoring division algorithm.)
Multiply step (Each instruction cycle executes a step of a modified Booth's algorithm for two's multiplication. One step is required for each two bits of the multiplier.)
Standard shift functions (right, left, logical, arithmetic, and circular, from one to eight bits per instruction cycle using the high-speed combinatorial shifter)
Extended shift operations on the contents of B and Q (right or left, logical or arithmetic). Multiplex and shift networks 14 and 15 for the B and Q registers provide right and left shifts; the right shift network 16 for the ALU provides right shift only. Right shifts of the B and Q registers can be either a single bit or a double bit shift.
Single bit data and status testing
Comparison testing (equal, greater than, less than; both magnitude and algebraic comparison)
Programmable logic gate functions (data flow slices are controlled to perform as a single AND, OR, NAND, or NOR gate with program selectable inputs. Combinatorial logic elements and functions of this nature are described in the article entitled "Programmable Logic Element Processor" by J. L. Quanstrom that appeared in the IBM Technical Disclosure Bulletin of March 1979 at pages 3916-3918.)
Conversions to absolute value, one's complement, or two's complement
Increment and decrement with test for zero.

Figure 2A:
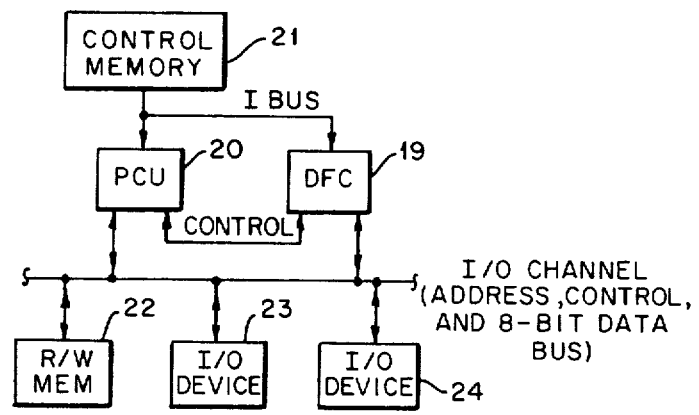
FIG. 2A shows utilization of the data flow component on a standalone basis in a microprocessor or controller system.
Figure 2B:
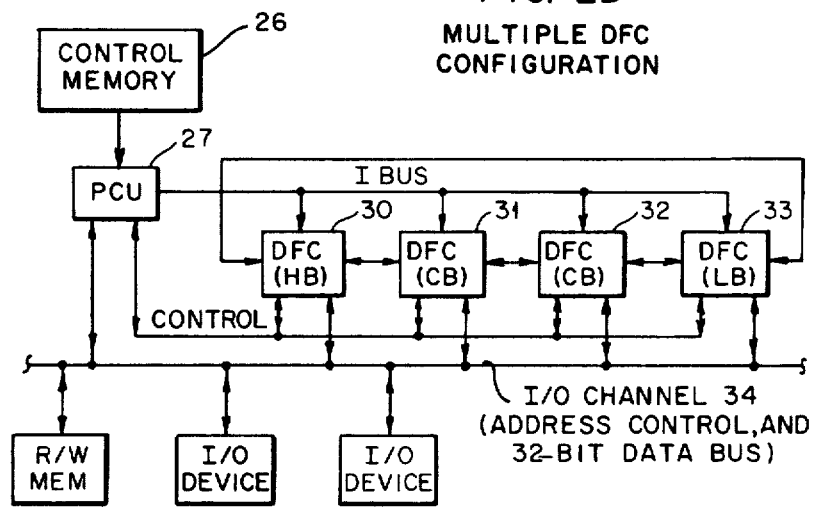
FIG. 2B shows the data flow component in use in a microprogrammable control unit for a high performance central processing unit (CPU).

Possible configurations using the data flow component (DFC) are illustrated in FIGS. 2A and 2B. FIG. 2A illustrates standalone use of the data flow component 19 in a microprocessor or controller system, including a processor control unit (PCU) 20 receiving microinstructions from a control memory 21 and having a read/write (R/W) memory 22 as well. The input/output (I/O) devices 23 and 24 represent the interfaces to a master computer and one or more peripheral devices. FIG. 2B represents a microprogrammable control unit used in the design of a high performance central processing unit (CPU), wherein control memory 26 is the source of microinstructions that control a sophisticated processor control unit (PCU) 27 which in turn generates or routes commands to a set of four data flow components 30-33, each of which operates on a separate part of a 32-bit data channel 34.

The two systems differ primarily in data path width and in complexity and sophistication of the processor control unit logic and control programming. A wide variety of systems can be designed by combining special purpose PCU designs with different sized sets of data flow components. This helps to overcome the LSI limitations noted earlier by achieving a good compromise between the flexibility of a special purpose design (processor control unit and control program) and the economies of using general purpose wide use data flow components. This solves a major problem in the use of currently available microprocessors, which tend to be restrictive in their range of potential applications as a result of fixed limits imposed by technology on such factors as processor performance and data widths.

Figure 3:
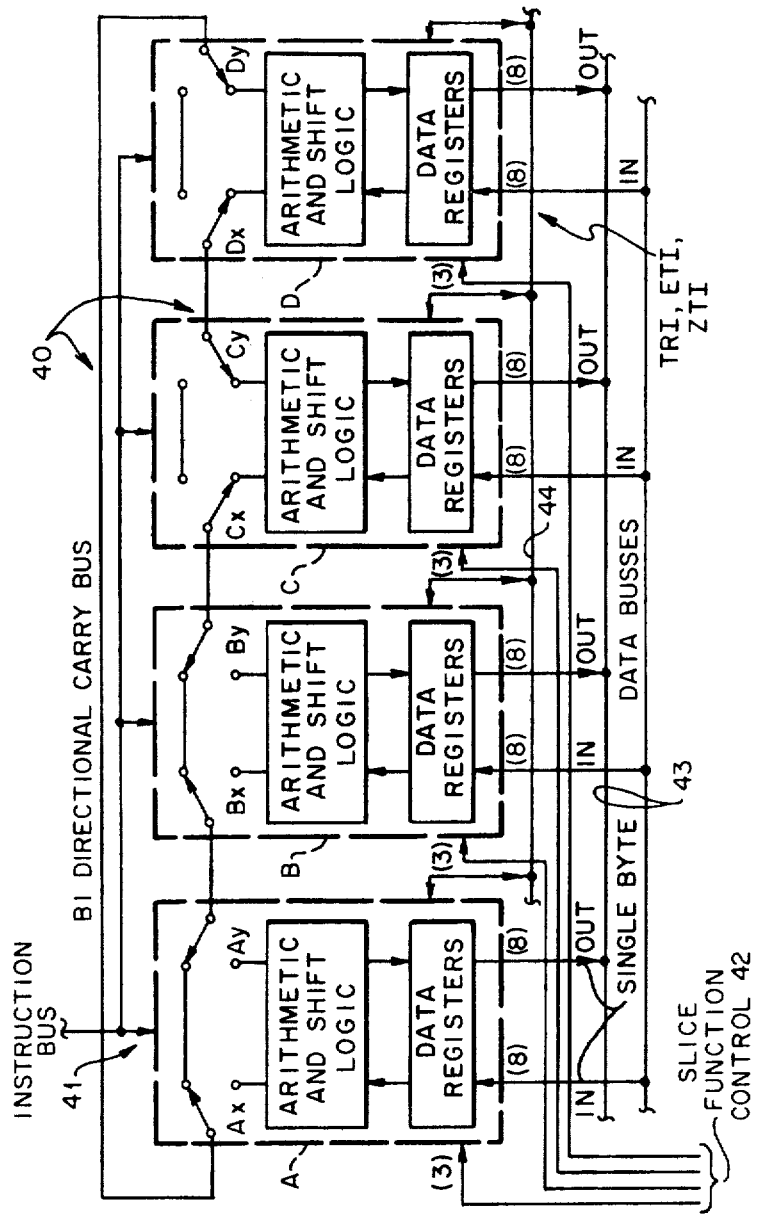
FIG. 3 illustrates features of the data flow component that enable its efficient and flexible utilization in multiple slice structures.

FIG. 3 illustrates, in more detailed fashion, features of the data flow component design that permit efficient and flexible use in multiple slice structures. Each of the four data flow component slices is identified by a letter, A-D from left to right, and each slice includes data registers and arithmetic and shift logic, the latter having carry inputs (x) and carry outputs (y). Significant control lines and buses are defined as follows:

1. Bidirectional Carry Bus 40—Includes all lines, both unidirectional and bidirectional, used to transfer shift and arithmetic carry information.

2. Instruction Bus 41—Supplies an encoded instruction or command simultaneously to all slices.

3. Slice Function Control 42—A separate set of encoded control lines to each slice determines the behavior of a slice as one of the following:

NAB—Nonactive Byte
LB—Lowest Active Byte (least significant)
HB—Highest Active Byte (most significant)
CB—Central Active Byte (between Lowest Active Byte and Highest Active Byte, any position)
SAB—Standalone Byte The specification of these five distinct behaviors requires three lines per slice.

4. Data Buses 43—Each slice serves a corresponding eight bits of each data bus. The number of slices determines the total width of the bus.

5. Interslice Control Bus 44—Provides necessary communication between slices for control and is also used to convey test result information from individual slices to the processor control unit. Each line acts as a wired OR connection between slices such that it can be activated by any slice, and its state can be sensed by any slice or by the PCU. The bus consists of a small number of lines that are shared by different functions, depending on the instruction being executed. In the embodiment of FIG. 1, it is limited to three lines identified as follows:

TRI—Test Result Indicator
ETI—Even Test Indicator
ZTI—Zero Test Indicator

The names of these lines are indicative of particular individual functions for which they are used in the majority of the cases. However, they are also used as a group to convey encoded control information, as well as separately to transmit other special control signals unrelated to the named functions.

To illustrate the main characteristics or features of data flow component operations, a four slice configuration, such as represented by FIGS. 2B and 3, will be assumed. By varying the Slice Function Control signals, which may be done by the processor control unit in response to special microinstructions from control storage, a variety of operation modes are possible, for example:

1. Combined operations of all four slices. Slice A is controlled to function as the Highest Active Byte, slices B and C as Central Active Byte slices, and slice D as a Lowest Active Byte slice. This combination performs operations on 32-bit operands and supplies 32-bit results to the output data bus, which can be gated to either an internal register (A, B, Q or S) or to an external destination.

2. Standalone operation of any selected slice. The selected slice operates on a single byte in the same fashion as a data flow element of an 8-bit processor, being totally independent of the state of any other slice. External carry, control, and status signal lines from other slices are ignored.

3. Any subset of the four slices can be operated as a combination. For example, slice A can be selected as the Highest Active Byte, slice B as the Central Active Byte, slice C as the Lowest Active Byte and slice D as a Nonactive Byte to produce the effect of a 24-bit processor acting on the three highest order bytes. In fact, any of ten different combinations are allowed (all combinations of two out of four and three out of four).

In multiple-slice operations that use less than the total number of slices available, the inactive slices must be controlled to act as Nonactive Bytes. The Nonactive Byte state of a slice causes it to act as a simple transmission link between the active slices. Input carry signals are switched directly to the output carry lines, bypassing the internal shift and ALU logic. Other effects of the Nonactive Byte state are inactive of internal clock signals to prevent any change in the state of internal registers and inactivation of all outputs to external control and status lines used in common with other slices. The only effect of the Nonactive Bytes on the operations of active slices is the carry propagation delay produced by the necessity of passing through the Nonactive Byte receiver, driver, and switching circuits.

The internal bypass switching logic is illustrated in FIG. 3, which shows that signals received from the bidirectional carry bus can be routed either to the arithmetic and shift logic or directly to the carry output terminals of a slice. The switch connections in the figure indicate that A and B are being treated as Nonactive Bytes, while C and D are Highest Active Bytes and Lowest Active Bytes, respectively. Since the bidirectional carry bus handles carries in either direction, left or right, the switching logic in the Nonactive Byte slices must be controlled to pass a carry signal either from left to right (x to y) or from right to left (y to x). The necessary gating is controlled by decoding the current instruction which is received in all slices, including Nonactive Bytes. The instruction register is the only internal register that can be loaded while in the Nonactive state. The purpose of loading the instruction register in the Nonactive Byte state is to supply the necessary shift direction information for controlling the shift carry transfer logic needed to propagate carries in either direction between active slices that are executing left or right shift operations.

Standalone Byte (SAB) slices are conditioned by the Slice Function Control lines to operate independently of the external carry bus and the Interslice Control bus, which is used by a Standalone Byte only to send test result information to the processor control unit. Therefore, two or more slices can function simultaneously as Standalone Bytes, executing the same instruction on different bytes of data. The only problem would be identifying the source of a test result signal since the Test Result Indicator (TRI) line can be activated by any active slice. This would not be a problem for instructions that do not depend on the line, i.e., any non-test type of instruction. If multiple standalone slice operations are needed, each slice can be provided with an individual test line connection to the processor control unit.

Solutions to two of the specific problems noted earlier have now been described, namely, individual slice function control dependent on slice position and a mechanism for handling arithmetic and shift carries between slices that permits flexible variable width data path operations. The third problem is interslice communication. The extent of the need for efficient interslice communication as well as the solution can be best shown by using specific instructions as examples. A simple example is the Convert to Absolute Value (ABS) instruction which converts the two's complement operand in register A to its absolute value and presents the result to the data bus out (DBO), FIG. 1. It also sets the Even and Zero status indicators in the S register to reflect the result. All active slices receive and execute the same instruction on different bytes of the operand. However, conditions or results of actions in one slice may affect the actions of other slices. For example, in the ABS instruction:

1. The sign bit of the operand, located in Highest Active Byte, determines whether the action of each slice is to be a subtraction of the contents of A from B with the output of B forced to zero, or a simple transfer of the original operand unchanged. The Test Result Indicator (TRI) line is used to convey this information to all slices.

2. The result is tested in Lowest Active Byte to determine whether it is even or odd. The corresponding status is set in Highest Active Byte. The necessary communication link is provided by the Even Test Indicator (ETI) line.

3. A single Zero Test Indicator (ZTI) line supplies the result of zero tests in all slices to set the Zero status bit in Highest Active Byte. The Zero Test Indicator line is activated by each slice such that if any slice detects a non-zero result, Zero Test Indicator is forced to indicate non-zero, which is equivalent to a wired Oring of the non-zero result signals from each slice.

In the above example, the Test Result Indicator line was used to convey control information between slices. In test instructions, such as bit tests, comparison tests, and increment or decrement with a test for zero, the Test Result Indicator line is used to signal a true or false result indication to the processor control unit. In this case, also, the line may be activated by any slice depending on the location of the tested condition. In a test for zero, the Zero Test Indicator line conveys the aggregate result to the Highest Active Byte where it is output to the Test Result Indicator line.

Another use of the Test Result Indicator, Even Test Indicator, and Zero Test Indicator lines is as a path for encoded control information, generated by one or more slices to be used in controlling the actions of other slices. An example is found in the execution of the Multiply Step Instruction. The data flow component uses a known procedure which has been referred to in the literature as the "modified Booth's algorithm" as used in the IBM System/360. This procedure starts with the multiplicand in the A register and the multiplier in the Q register. The product is developed in the B and Q registers by a sequence of conditional arithmetic (addition or subtraction) and shift operations. The conditions that govern the types of operations performed by each of a sequence of identical multiply step instructions are supplied by the two least significant bits of the Q register, which are designated Q6 and Q7 of the Lowest Active Byte, and a special status bit, which acts as a low end extension of the Q register during right shift operations and will therefore be referred to as Q8. During each multiply step the actions of all slices vary according to the following truth table:

| Q6 | Q7 | Q8 | Action |
|----|----|----|--------|
| 0 | 0 | 0 | No arithmetic operation, shift 2 positions |
| 0 | 0 | 1 | Add A to B, and shift 2 positions |
| 0 | 1 | 0 | Add A to B, and shift 2 positions |
| 0 | 1 | 1 | Pre-shift 1 position, add A to B, and post-shift 1 position |
| 1 | 0 | 0 | Pre-shift 1 position, subtract A, and post-shift 1 position |
| 1 | 0 | 1 | Subtract A from B, and shift 2 positions |
| 1 | 1 | 0 | Subtract A from B, and shift 2 positions |
| 1 | 1 | 1 | No arithmetic operation, shift 2 positions |

At the end of each step the Q register is shifted right two positions and the two vacated most significant bit positions are filled by carries from the B register and ALU shift networks via lines in the carry bus. As previously indicated, the Q6 and Q7 variables of the truth table are located in the Lowest Active Byte. However, due to the convenience of having all special status information located in the same byte of the S register, Q8 is assigned to a bit of the S register in the Highest Active Byte. Due to the bidirectional nature of the interchip control lines, this presents no particular problem. Test Result Indicator, Even Test Indicator, and Zero Test Indicator are used, respectively, to supply the state of Q6, Q7, and Q8 to all slices. Test Result Indicator and Even Test Indicator are activated by Q6 and Q7 in Lowest Active Byte, while Zero Test Indicator is activated by the Q8 indicator bit in the S register of Highest Active Byte. To provide the effect of shifting data from Q6 to Q8 in the shift operation, Test Result Indicator, representing the state of Q6, is simply gated to the input of the Q8 status indicator in Highest Active Byte. This is a further illustration of the flexibility provided by the interslice control lines.

One more example of the shared use of the interslice control lines is provided by the Divide Step Instruction. Each instruction cycle executes one step of a nonrestoring division algorithm by using interslice control lines as follows:

A conditional addition of subtraction is performed by every slice depending on the state of the negative indicator set in Highest Active Byte as a result of the preceding step. The state of the indicator is conveyed via Test Result Indicator.

The Least Significant Bit (LSB) of Q, located in Lowest Active Byte, is set according to the sign of the result of the current operation, addition or subtraction. The state of the sign bit is transferred from Highest Active Byte to Lowest Active Byte via Even Test Indicator.

Thus, a small number of lines can be made to serve the interslice control requirements of a large variety of commands or instructions. Heretofore, the number of pins required for interconnects between slices has been a limiting factor in the performance and functional diversity that can be achieved in an LSI design.

While a preferred embodiment of the invention has been illustrated and described, it is to be understood that there is no intention to limit the invention to the precise construction herein disclosed and the right is reserved to all changes and modifications coming within the scope of the invention as defined in the appended claims.

We claim:

1. A data processing system utilizing data flow components, such system having a processor control unit for processing microinstructions, and generating instruction signals, a control memory interconnected with said processor control unit to supply said microinstructions thereto, signal lines for interconnecting said data flow components to conduct signals for performing arithmetic and logical functions on data in said system, and interface means for interfacing the aforesaid elements to other elements in said system, said system comprising:

a plurality of data flow components, each of said data flow components including data registers and arithmetic and shift logic, each of said data flow components serving as a byte-wide slice and having a carry input circuit and a carry output circuit interconnected by way of a carry bypass bus, the carry input and carry output circuits in each data flow component comprising switching circuits controllable to route carry signals to and from their respective data flow component or to bypass carry signals around said respective data flow component, a test and control logic unit for providing test and control signals pertaining to said data flow components and responsive to instruction signals from said processor control unit to initiate and control said data flow component arithmetic and logic operations, said data flow components each being responsive to instruction signals from said processor control unit to perform one or more arithmetic and logic operations, such as add, subtract, divide, multiply, (including shift) data and status testing, and comparison testing, and each data flow component being operable in the following operating modes:

LB—Lowest Active Byte wherein a data flow component operates as least significant slice, HB—Highest Active Byte wherein a data flow component operates as most significant slice, CB—Central Active Byte wherein a data flow component operates as an intermediate slice between LB and HB, any position, SAB—Standalone Byte wherein a data flow component operates as a single slice independently of all other slices, NAB—Non-Active Byte wherein a data flow component is not active but, by way of said carry bypass bus, serves as a transmission link between data flow components that are active slices, a carry bus, said carry bus being connected to selected ones of said carry inputs and carry outputs of said data flow components to transfer shift and arithmetic carry information;

an instruction bus for supplying instruction signals from said processor control unit simultaneously to all of said data flow components for controlling their operation;

a plurality of data buses interconnected to convey full width data signals in said system among said processor control unit, said data flow components and other elements in said system, each of said data flow components serving a predetermined portion or "slice" of each data bus and the number of "slices" determining the total width of the data bus;

a control bus interconnected between said processor control unit and each of said data flow components to provide signals for communication between components and for control purposes, and also to convey signals representative of test result information from individual data flow components to said processor control unit, each line of said control bus being connected to said data flow components so that it can be activated by any component and so that its state can be sensed by any component or by the processor control unit whereby a small number of lines serves the control requirements of a large variety of commands or instructions;

a slice function control bus including a set of encoded control lines interconnected to each data flow component and providing slice status signals to each data flow component responsive to status signals from said processor control unit to establish the status of each data flow component in accordance with said operating modes whereby said system can utilize said slices in:

(1) multiple-slice active combined operations of all slices, (2) active standalone operation of any selected slice, (3) multiple-slice operation of any active subset of less than the total number of available slices in any combination with selected ones of said slices being non-active and serving only as a transmission link between active slices.

2. The data processing system of claim 1, wherein said control bus includes three lines for transmitting information as follows:

TRI—Test Result Indicator
ETI—Even Test Indicator
ZTI—Zero Test Indicator, said lines being indicative of indicator signals for which they are normally used but said lines further being used as a group to convey encoded control information as well as separately to transmit other special control signals unrelated to the designated named indicator signals.

* * * * *